United States Patent Office 2,992,264
Patented July 11, 1961

2,992,264
NEW SYNTHESIS OF PHOSPHORODITHIOATE ESTERS

Bernard Miller, Stamford, Conn., assignor to American Cyanamid Company, New York, N.Y., a corporation of Maine
No Drawing. Filed May 11, 1960, Ser. No. 28,243
5 Claims. (Cl. 260—461)

This invention relates to a novel process for preparing certain phosphorodithioate esters, useful as active components in pesticidal compositions. More particularly, the invention relates to an extremely rapid reaction involving a dithiophosphonothioate and certain organometallic compounds.

The phosphorodithioate esters prepared by the process of the present invention may be represented as:

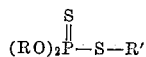

wherein R is a lower alkyl group and R' is either a lower alkyl or aryl radical. Such compounds find utility as insecticides. Since the compounds of the invention are markedly active even when substantially diluted in an inert commercially available carrier well known in the art, it is highly desirable to provide an economical, safe and straightforward process to obtain the compounds defined above.

It has been unexpectedly found that a dithiophosphonothioate when admixed and reacted with an organometallic compound, the desired phosphorodithioate compound above identified is rapidly obtained. Surprisingly, the reaction involving a dithiophosphonothioate and a basic organometallic compound, such as n-butyl lithium or phenyl magnesium chloride, does not cause the phosphorous atom of the dithiophosphonothioate reactant to be affected as is the course of analogous reactions involving phosphonodithioate disulfides and a basic compound. Rather, the bridging sulfur atoms are unexpectantly involved in the instant invention.

In accordance with the process of the invention, a basic reactant, such as either a lower alkyl alkali metal which can be exemplified as butyl lithium, or an alkyl or aryl magnesium chloride or bromide is reacted in an inert solvent with a dithiophosphonothioate of the structure:

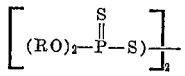

where R is a lower alkyl radical.

The dithiophosphonothioate reactant contemplated herein includes such compounds as:

O,O,O',O'-tetramethyl dithiophosphonothioate
O,O,O',O'-tetraethyl dithiophosphonothioate
O,O-diethyl O',O'-dimethyl dithiophosphonothioate
O,O,O',O'-tetrapropyl dithiophosphonothioate
O,O,O',O'-tetrabutyl dithiophosphonothioate Illustrative basic lower alkyl alkali metal compounds include:

Methyl lithium
Ethyl lithium
n-Propyl potassium
Isopropyl sodium
n-Butyl lithium
Tert.-butyl lithium Alternatively, Grignard basic compounds may be used. Such are, for instance:

Methyl magnesium chloride
Ethyl magnesium bromide
n-Propyl magnesium chloride
Phenyl magnesium bromide
Benzyl magnesium chloride In general, the reaction may be carried out at temperatures within the range of from about 0° C. and 100° C., and preferably at between about 20° C. and 40° C. It has been found that under ambient temperatures the time for effecting the reaction is relatively rapid. The reaction may be completed within about two hours and usually a time range of from 15 to 30 minutes is sufficient at temperatures of from 30° C. to 40° C. in an inert solvent. Suitable inert solvents include for instance: hexane, cyclohexane, tetrahydrofuran, ether, xylene, toluene and the like.

Advantageously, the amounts of the reactants employed are not critical. Although equimolar quantities of each reactant are preferred, smaller or larger amounts of each may be utilized.

The phosphorodithioate esters produced by the process of the present invention are active insecticides and may be used as sprays in organic solvents, as emulsions in water or other non-solvents or on solid carriers, such as talc, clays and the like. Relatively small amounts of phosphorodithioate ester may be incorporated in the inert carrier. Usually of from 0.1% to about 5% of the active compound, based on the weight of the carrier is sufficient to obtain effective insecticidal activity.

The following examples will serve to further illustrate the invention. They are not to be taken as limitative thereof. Unless otherwise noted, the parts are by weight.

EXAMPLE 1

*Preparation of O,O-diethyl, S-butyl phosphorodithioate*

To 10.45 parts of O,O,O',O'-tetraethyldithiophosphonothioate (0.028 mol) having the structure:

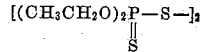

in 14 parts of ethyl ether are added slowly 10 parts by volume (0.0303 mol) of 3.03 N butyl lithium in 20 parts by volume of ether. The addition requires 15 minutes. The mixture is stirred for an additional 10 minutes, washed with water, and dried over magnesium sulfate. Evaporation of the solvent leaves 5.85 parts (86% of theory) of light brown liquid, $n_D^{25}$ 1.4947.

EXAMPLE 2

*Preparation of O,O-diethyl, S-(2,2-dimethyl)ethylphosphorodithioate*

To 10.40 parts of O,O,O',O'-tetraethyl dithiophosphonothioate (0.028 mol) in 10 parts by volume of anhydrous ethyl ether are added 20 parts of 1.61 N i-Butyl magnesium bromide (0.0322 mol) over a 15 minute period. After stirring for one-half hour, the reaction mixture is poured onto ice and washed with dilute hydrochloric acid and water, and dried over magnesium sulfate. Evaporation of the solvent left 7.51 parts of a liquid product. 7.19 parts of the latter are distilled at 16–25µ pressure, to give 6.56 parts of O,O-diethyl, S-(2,2-dimethyl) ethylphosphorodithioate, $n_D^{25}=1.4977$–1.4954. The yield is 99% of theory.

EXAMPLE 3

*Preparation of O,O-diethyl, S-phenylphosphorodithioate*

7.9 parts of O,O,O',O'-tetraethyl dithiophosphonothioate (0.02 mol) are dissolved in 25 parts of anhydrous ethyl ether. 27 parts of 0.850 N phenyl magnesium bromide (0.023 mol) are added dropwise over a 15 minute period to the stirred solution. Stirring was continued at room temperature for 20 minutes and at 30° C. for one-half hour. The reaction mixture is poured onto ice, washed with dilute hydrochloric acid, dilute sodium bicarbonate and water, and dried over magnesium sulfate. Evaporation of the solvent leaves 5.95 parts of a yellow oil product, which is molecularly distilled at 8–15μ to give 4.8 parts of O,O-diethyl-S-phenylphosphorodithioate which is identified by comparison of its infra red spectrum with that of an authentic material. An 86% yield of a colorless oil product is obtained.

EXAMPLE 4

*Preparation of O,O-diethyl, S-benzyl phosphorodithioate*

To 10.27 parts of O,O,O',O'-tetraethyl dithiophosphonothioate (0.0277 mol) in 10 parts of ethyl ether are added 25 parts of 1.270 N benzyl magnesium chloride (0.0317 mol). After stirring for one-half hour, additional ether is added and the solution washed with dilute hydrochloric acid and water, and dried over magnesium sulfate. Evaporation of the solvent leaves 9.95 parts of a greenish liquid. 7.8 parts of the latter product is distilled in a molecular still at 8–22μ pressure. O,O-diethyl, S-benzyl phosphorodithioate is obtained in a 92.5% yield, based on the starting dithiophosphorothioate ester. The compound is characterized by comparison with an authentic sample and possesses an index of refraction $(n_D^{25})$ equal to 1.5550.

Although each of the examples exemplifies O,O,O',O'-tetraethyl dithiophosphonothioate, any of the corresponding dialkyl dithiophosphonothioates listed above may be similarly employed.

It is an advantage of the present invention that the process can be carried out in relatively short periods of time in a straightforward manner. Thus, where attempts have been made to synthesize, for example, O,O-diethyl, S-butyl phosphorodithioate of Example 1 above utilizing the potassium salt of O,O-diethyl phosphorodithioic acid

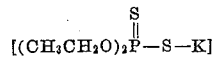

and n-butyl bromide, the reaction takes place slowly under reflux. At least 16 hours or more must be employed to obtain yields above 75%. It will be noted that these yields are substantially lower than those obtained utilizing the process of the present invention.

Similarly, where isobutyl bromide is reacted with the potassium salt of O,O-diethyl phosphorodithioic acid to obtain the product of Example 2 above [O,O-diethyl S-(2,2-dimethyl) ethyl-phosphorodithioate], the reaction must be conducted under refluxing temperatures for about 26 hours.

It will be readily observed that the instant reactions compared to those of the prior practice as defined above demonstrate a highly desirable process long sought for in the art.

I claim:

1. A process for preparing a phosphorodithioate ester represented by the structure:

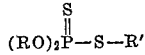

wherein R is a lower alkyl group and R' is a radical selected from the group consisting of lower alkyl, aryl and aralkyl radicals which comprises: reacting a dithiophosphonothioate of the structure:

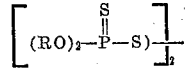

where R is as above defined, with a basic reactant selected from the group consisting of a lower alkyl alkali metal, a lower alkyl magnesium halide, an aryl magnesium halide, and an aralkyl magnesium halide in substantially equimolar proportions for a time sufficient to cause reaction but not in excess of about two hours, and recovering thus-formed phosphorodithioate ester.

2. The process according to claim 1 in which the dithiophosphonothioate is O,O,O',O'-tetraethyl dithiophosphonothioate and the basic reactant is n-butyl lithium.

3. The process according to claim 1 in which the dithiophosphonothioate is O,O,O',O'-tetramethyl dithiophosphonothioate and the basic reactant is phenyl magnesium chloride.

4. The process according to claim 1 in which the dithiophosphonothioate is O,O-diethyl-O',O'-dimethyl dithiophosphonothioate and the basic reactant is benzyl magnesium chloride.

5. The process according to claim 1 in which the dithiophosphonothioate is O,O,O',O'-tetraethyl dithiophosphonothioate and the basic reactant is isobutyl magnesium bromide.

No references cited.